United States Patent
Raman et al.

(10) Patent No.: US 10,380,005 B2
(45) Date of Patent: Aug. 13, 2019

(54) SYSTEM AND METHOD FOR PRODUCTION TESTING OF AN APPLICATION

(71) Applicant: Dell Products, LP, Round Rock, TX (US)

(72) Inventors: Madhusoodhanan Raman, Bangalore (IN); Prabhat Kumar Patel, Sundergarh (IN)

(73) Assignee: Dell Products, LP, Round Rock, TX (US)

( * ) Notice: Subject to any disclaimer, the term of this patent is extended or adjusted under 35 U.S.C. 154(b) by 242 days.

(21) Appl. No.: 14/974,646

(22) Filed: Dec. 18, 2015

(65) Prior Publication Data
US 2017/0177464 A1   Jun. 22, 2017

(51) Int. Cl.
G06F 11/36  (2006.01)
G06F 21/62  (2013.01)

(52) U.S. Cl.
CPC ...... *G06F 11/3672* (2013.01); *G06F 11/3684* (2013.01); *G06F 21/6227* (2013.01)

(58) Field of Classification Search
CPC ............. G06F 11/3672; G06F 11/3684; G06F 17/30312; G06F 17/30528
USPC ........................................................ 717/124
See application file for complete search history.

(56) References Cited

U.S. PATENT DOCUMENTS

| | | | | |
|---|---|---|---|---|
| 8,938,648 B2 * | 1/2015 | Augustine | ........... | G06F 11/3688 714/38.1 |
| 9,239,717 B1 * | 1/2016 | AlSaeed | ............. | G06F 11/3688 |
| 2002/0184165 A1 * | 12/2002 | Deboer | ................... | G06Q 10/08 705/401 |
| 2006/0085484 A1 * | 4/2006 | Raizman | ........... | G06F 17/30336 |
| 2011/0202378 A1 * | 8/2011 | Rabstejnek | ............ | G06Q 10/06 705/7.12 |
| 2013/0014084 A1 * | 1/2013 | Sahibzada | ............. | G06F 11/368 717/124 |
| 2014/0026122 A1 * | 1/2014 | Markande | ........... | G06F 11/3664 717/124 |
| 2014/0101646 A1 | 4/2014 | Buzaski et al. | | |
| 2014/0282469 A1 * | 9/2014 | Johnson | .................... | G06F 8/65 717/170 |

(Continued)

OTHER PUBLICATIONS

Alan Choi. 2009. Online application upgrade using edition-based redefinition. In Proceedings of the 2nd International Workshop on Hot Topics in Software Upgrades (HotSWUp '09). ACM, New York, NY, USA, , Article 4 , 5 pages. DOI=http://dx.doi.org/10.1145/1656437.1656443.

*Primary Examiner* — Duy Khuong T Nguyen
*Assistant Examiner* — Theodore E Herbert
(74) *Attorney, Agent, or Firm* — Larson Newman, LLP

(57) ABSTRACT

A method includes receiving an updated application instance, a database instance, or any combination thereof, provisioning a first subset of application servers with the updated application instance or access to the updated database instance, and identifying a subset of users from a plurality of users to provide access to the updated instance for testing purposes. The method further includes authenticating users of the plurality of users, providing users of the subset of users with access to the updated instance and other users of the plurality of users with access to a production instance during a testing period, and, after the testing period, providing the other users with access to the updated instance.

12 Claims, 5 Drawing Sheets

(56) References Cited

U.S. PATENT DOCUMENTS

2015/0236917 A1\* 8/2015 Anderson .......... H04L 41/0893
  709/223
2017/0177464 A1\* 6/2017 Raman ................ G06F 11/3672

\* cited by examiner

SYSTEM AND METHOD FOR PRODUCTION TESTING OF AN APPLICATION

FIELD OF THE DISCLOSURE

The present disclosure generally relates to information handling systems, and more particularly relates to systems and methods for production testing of an application.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
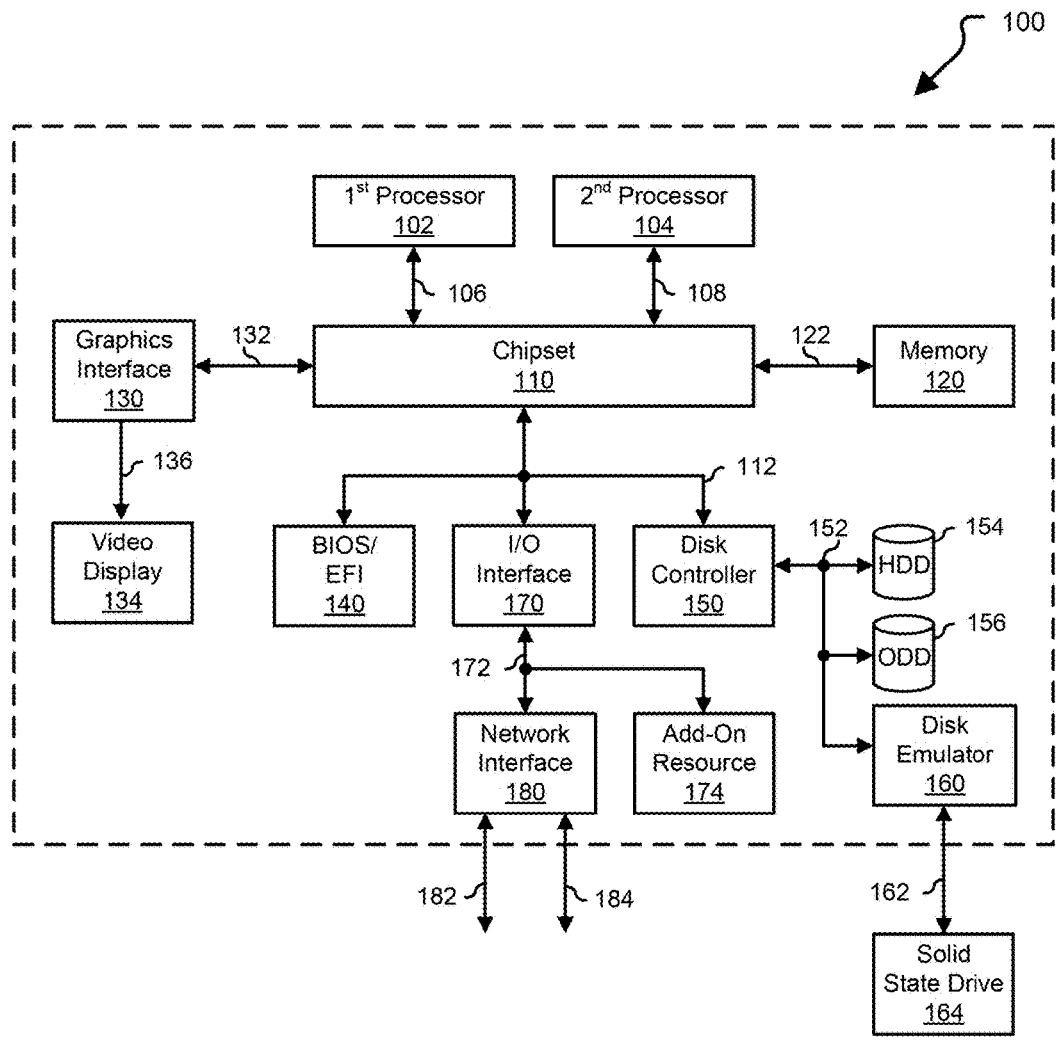
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
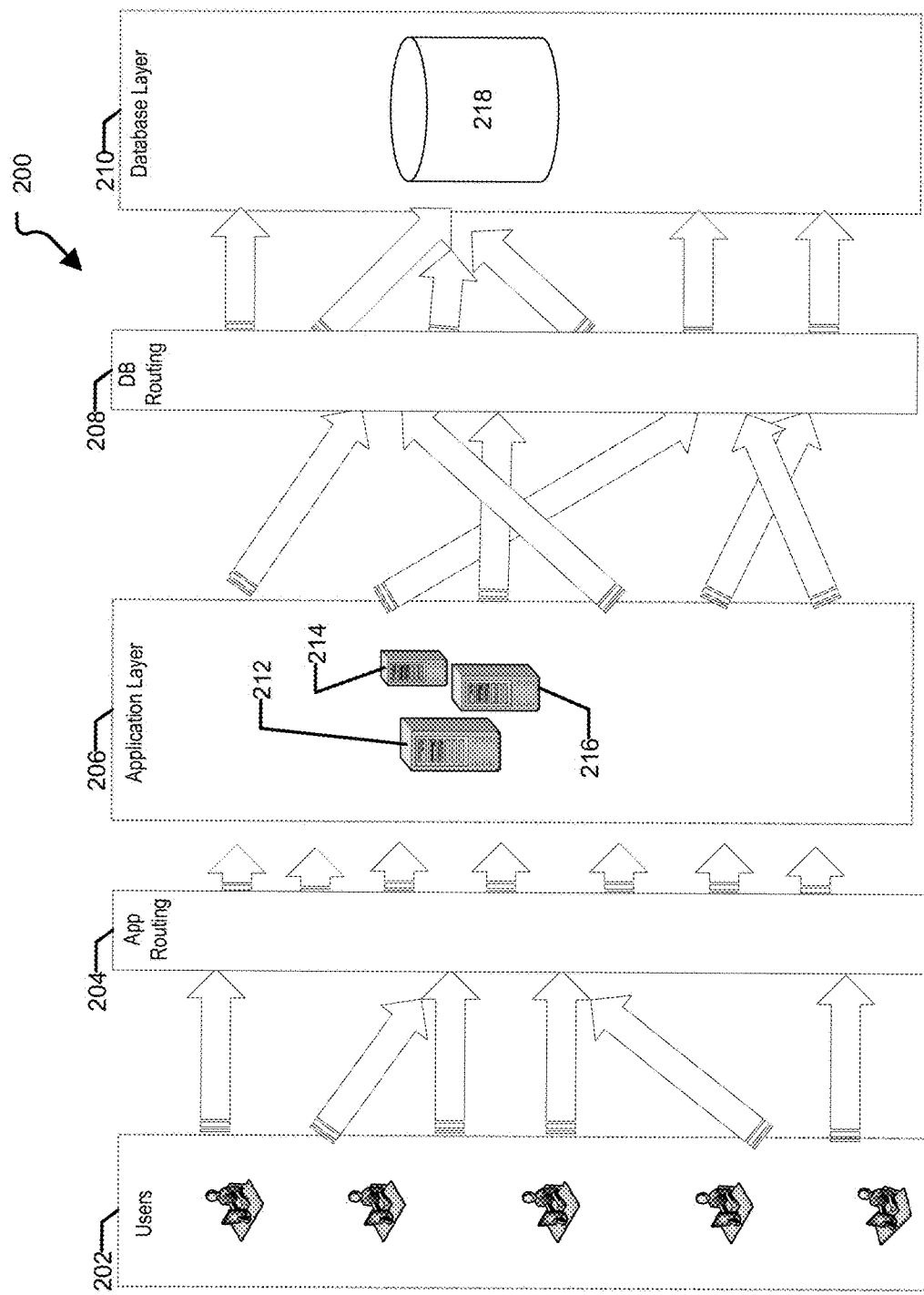
FIG. 2 is a block diagram illustrating a system for providing an network-based application to a plurality of users with a database backend, in accordance with various embodiments.
Figure 3:
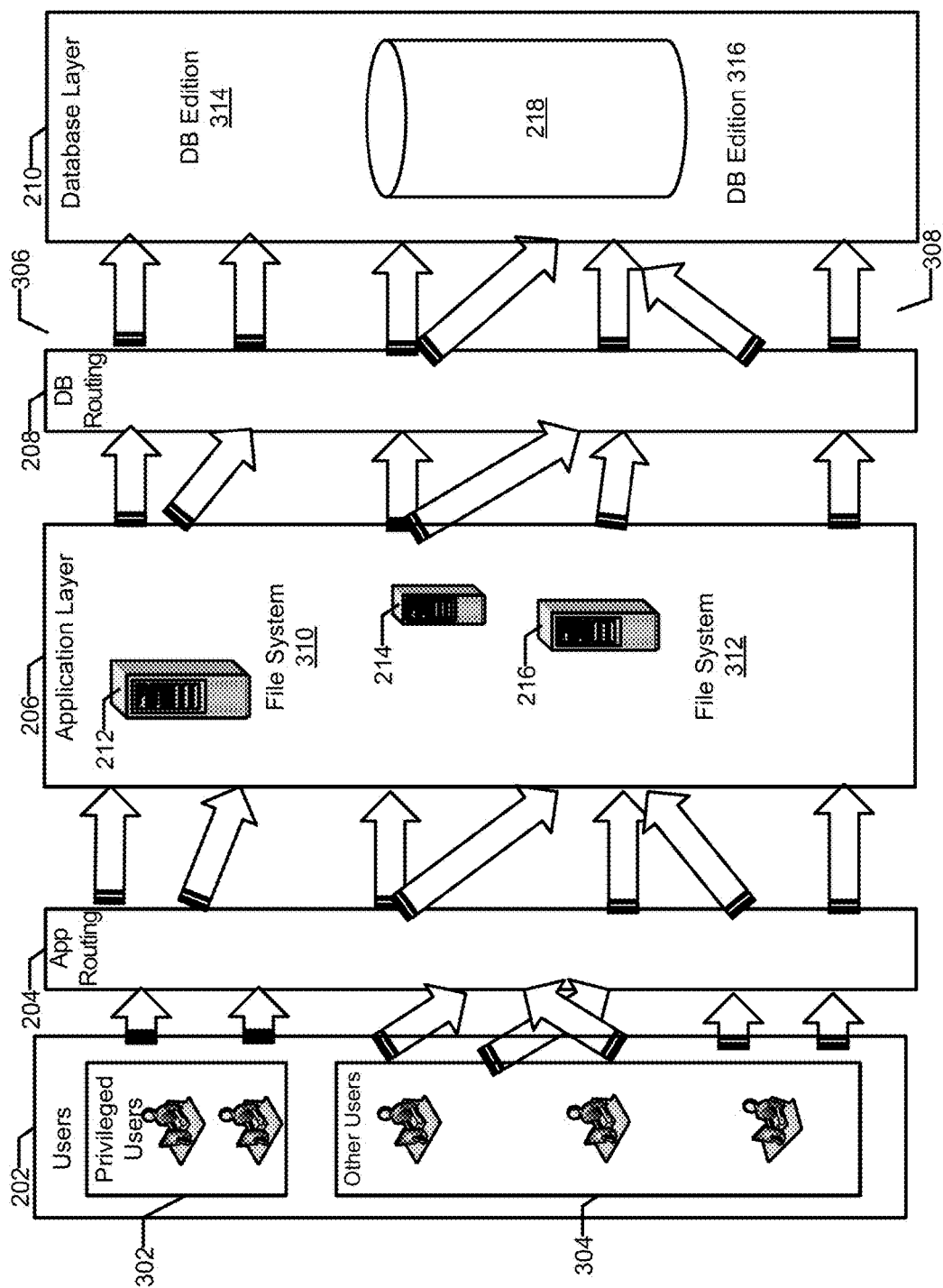
FIG. 3 is a block diagram illustrating a system for providing network-based application to a plurality of users with a database backend with two instances of the application and the database, in accordance with various embodiments.

FIGS. 2 and 3 show a system 200 for providing a network-based application. System 200 includes users 202, application routing 204, an application layer 206, database routing 208, and a database layer 210. Application layer 206 can include a plurality of application servers 212, 214, and 216. Database layer 210 can include a database 218.

Referring to FIG. 2, during a period when only a production instance is online and no updated or test instance is available, requests from users 202 can be distributed across the application server 212, 214, and 216. The requests can be distributed by application routing 204 to load balance the application servers 212, 214, and 216. The application servers 212, 214, and 216 can process a request from users and can send queries to the database layer 210 as needed. The necessary information can be retrieved from the database 218 and returned to the application servers 212, 214, and 216 enabling them to respond to the users. In various embodiments, when the database is implemented as multiple servers, either multiple servers connected to the same database storage or a distributed database with multiple servers each having a portion of the database storage, database routing can load balance across the multiple servers.

Referring to FIG. 3, when an updated instance of the application and/or database is provided, such as for testing purposes, a subset of users can be granted access to the updated instance. The system can partition the users into privileged users 302 and other users 304. Additionally, the system can partition the application servers and database servers between an updated instance 306 and a production instance 308. The application servers can be partitioned into the updated instance 306 and the production instance 308 by providing a file system 310 with the updated instance and a file system 312 with the production instance. Application servers 212, 214, and 216 can be configured such that a subset of application server, such as application server 212, can access file system 310 for the updated instance, and the other application servers, such as application servers 214 and 216, can access file system 312 for the production instance. Similarly, the database can be partitioned between the updated instance 306 and the production instance 308. In various embodiments, the database can maintain an updated edition 314 for the updated instance 306 and a production edition 316 for the production instance 308.

The application routing 204 can direct requests from privileged users 302 to application server 212 for access to the updated instance 306. Database routing 208 can direct queries to the updated edition 312 of the database 218. Similarly, application routing 204 can direct requests from other users 304 to application servers 214 and 216 for access to the production instance 308. Database routing 208 can direct queries to the production edition 316 of the database 218.

In various embodiments, after the updated instance 306 has been sufficiently tested and identified bugs have been resolved, the system can return to the single instance state, as shown in FIG. 2, except providing the updated instance to the users. Additionally, access to the former production instance may be eliminated or substantially restricted.

Figure 4:
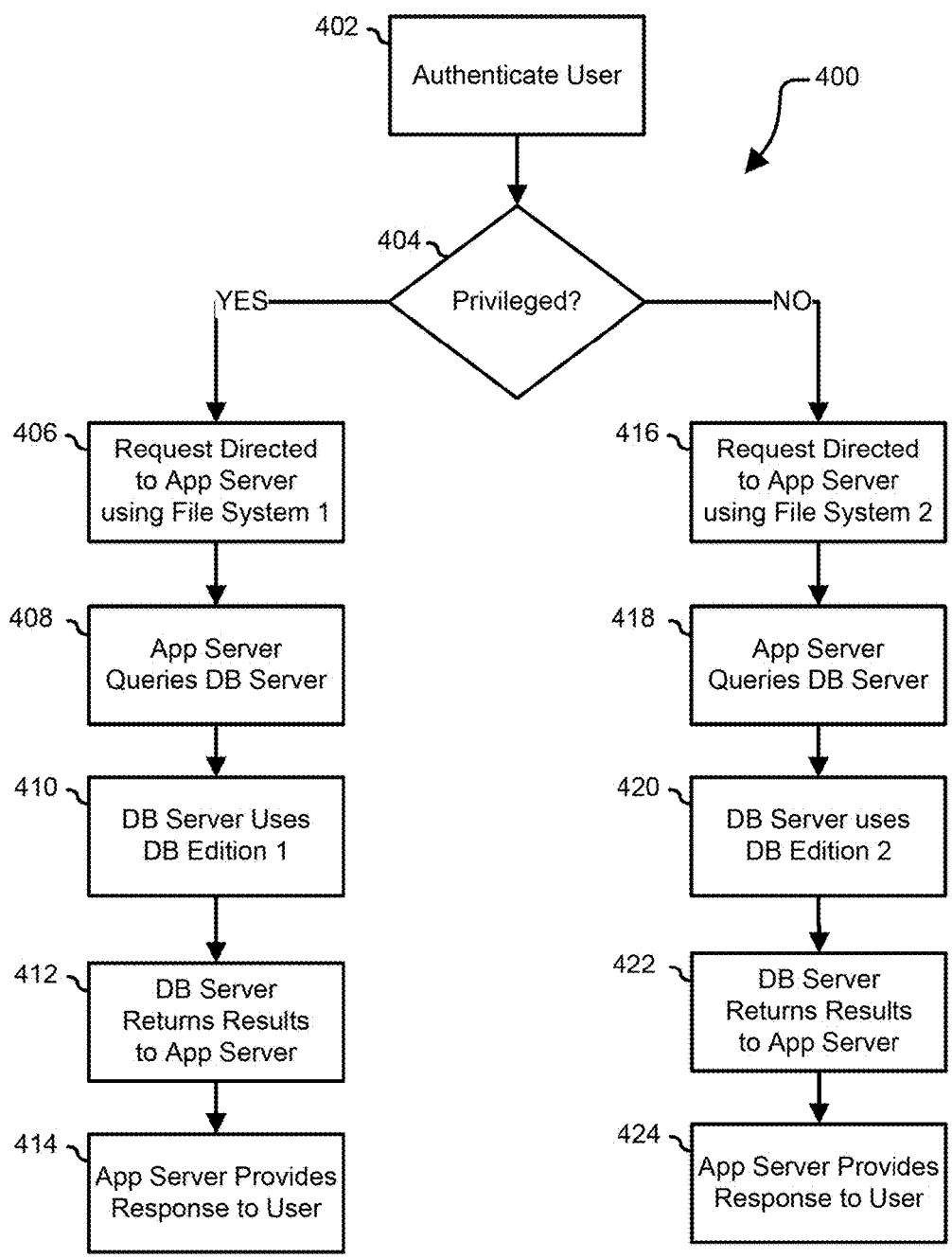
FIG. 4 is a flow diagram illustrating a method of providing access to multiple instances of a network-based application, in accordance with various embodiments.

FIG. 4 shows a method 400 of providing multiple instances of a network-based application. At 402, the system can authenticate a user. In various embodiments, the user can be authenticated against a list of users in a database. At 404, the system can determine if a user has privileged access that would allow the user access to an updated or test instance of the web-accessible application.

At 406, when a user is authorized to access the updated instance, the system, such as by using application routing 204 in FIG. 3, can direct requests from the user to an application server configured to access a file system associated with the updated instance. The application server can be a dedicated server configured to access the updated instance file system, the application server can be a virtual machine configured to access the updated instance file system and other virtual machines on the same hardware can be configured in other ways, or the application server can be an application container virtualized on the hardware, such that multiple application containers can provide similar or additional functionality.

At 408, the application server can query a database server, and at 410, the database server can retrieve information from a database edition configured with the updated instance of the database. In various embodiments, the database server can be a single database server, a distributed database consisting of a plurality of database servers each with their own storage, a plurality of database servers attached to a common storage, or other implementations of databases. In various embodiments, queries from the application server can be routed to a database server with access to the updated instance database edition.

At 412, the database server can return the results of the query to the application server, and 414, the application server can provide a response to the user. In various embodiments, the user with privileges to access the updated or test instance can utilize the updated or test instance.

Returning to 404, when the user is not authorized to access the updated or test instance of the web-based application, at 416, the system can direct requests from the user to another application server configured to access another file system containing the production instance of the web-based application. At 418, the application server can query a database server, and at 420, the database server can retrieve information from another database edition configured with the production instance of the database. In various embodiments, queries from the application server can be routed to a database server with access to the production instance database edition.

At 422, the database server can return the results of the query to the application server, and 424, the application server can provide a response to the user. In various embodiments, the user without privileges to access the updated or test instance can utilize the production instance without any impact or awareness of the updated instance.

In various embodiments, after testing of the updated instance, the updated instance can be used as a new production instance and all users can be granted access. Additionally, access to the prior production instance can be limited and the prior production instance may eventually be removed from the system. In various embodiments, the use of the updated instance during the testing period may uncover bugs, and multiple rounds of testing and bug fixing may occur before the updated instance is considered ready to become the new production instance.

Figure 5:
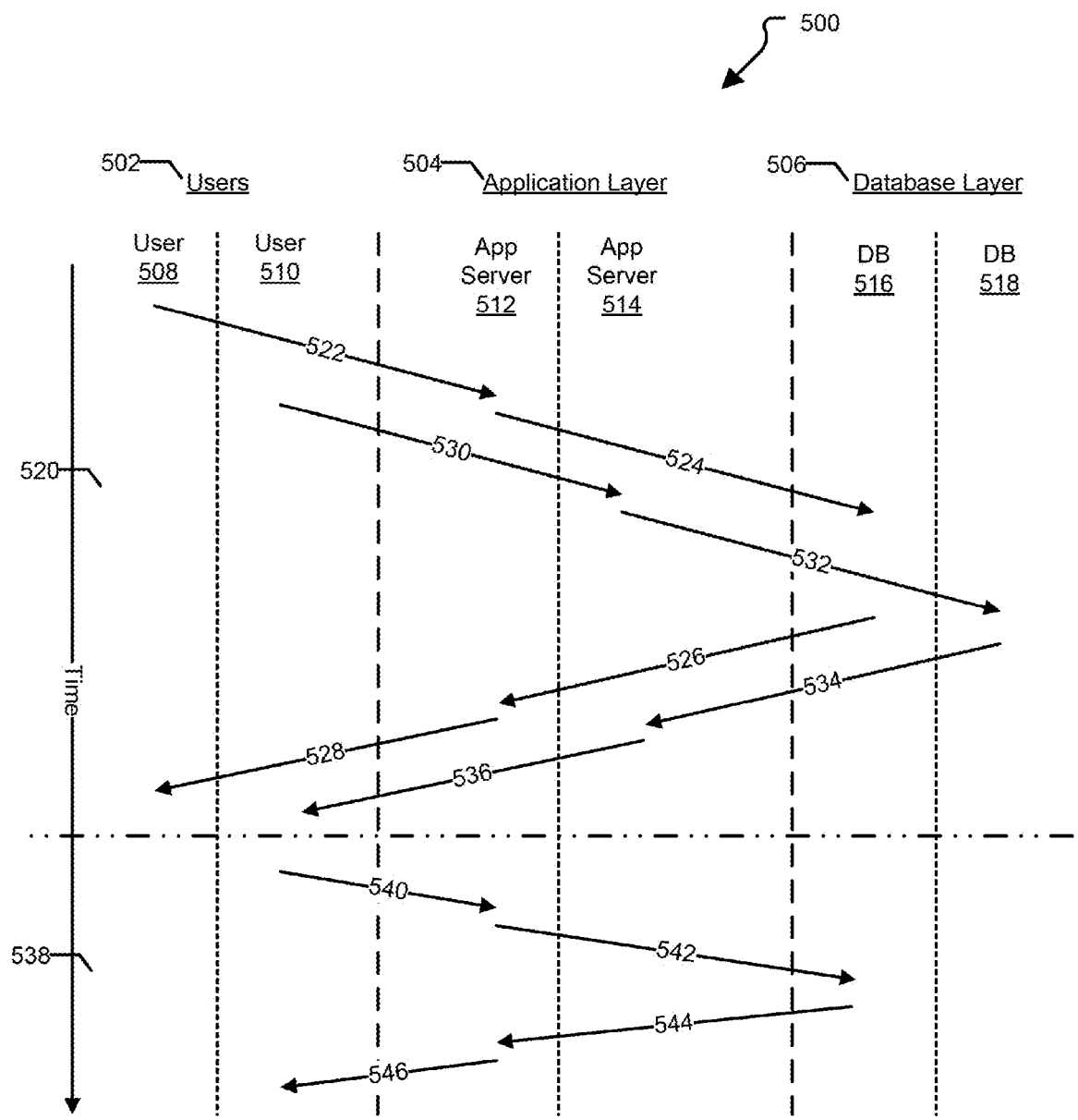
FIG. 5 is a diagram illustrating communication between users, an application layer, and a database layer, in accordance with various embodiments.

FIG. 5 is a diagram 500 illustrating the network connections between users, application instances, and database instances. The system can include users 502, an application layer 504, and a database layer 506. In this example, the users 502 can include user 508 and user 510, the application layer can include an application server 512 and an application server 514, and the database layer can include database instance 516 and database instance 518. User 508 can have privileges to access an updated instance of the web-based application. Application server 512 and database instance 516 can be configured with the updated application instance and the updated database instance, respectively.

During a testing period 520, user 508 can send a request 522 to the application layer 504. The request 522 can be directed to application server 512. Application server 512 can send a query 524 to database layer 506. The query 524 can be directed to database instance 516. The database instance 516 can send a result 526 of the query 524 to application server 512, and application server 512 can send a response 528 to the user 508.

Additionally, user 510 can send a request 530 to the application layer 504. The request 530 can be directed to application server 514. Application server 514 can send a query 532 to database layer 506. The query 532 can be directed to database instance 518. The database instance 518 can send a result 534 of the query 532 to application server 514, and application server 514 can send a response 536 to the user 510.

After the testing period and the update instance has been determined to be ready for production (time period 538), a request 540 from user 510 can be directed to application layer 504. The request 540 can be directed to application server 512. Application server 512 can send a query 542 to database layer 506. The query 542 can be directed to database instance 516. The database instance 516 can send a result 544 of the query 542 to application server 512, and application server 512 can send a response 546 to the user 510.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for controlling access to versions of an application, comprising:

providing a first file system with a test instance and a second file system with a production instance;

authenticating a first user and a second user, the first user having privileges to access a test instance of the application and the second user having privileges that prevent access to the test instance of the application and allowing access to a production instance;

directing a first request from the first user to a first application server of a plurality of application servers based on the first user having privileges to access a test instance of the application, the first application server accessing a first file system to provide the test instance to the first user;

directing a second request from the second user to a second one of the application servers based on the second user having privileges that prevent access to the test instance of the application and allowing access to a production instance, the second application server accessing a second file system to provide the production instance to the second user;

querying a database by the first application server in response to the first request, the database maintaining a first edition and a second edition;

querying the database by the second application server in response to the second request;

sending a response to the first request from the first application server to the first user based on the results of the query to the first edition of the database;

sending a response to the second request from the second application server to the second user based on the results of the query to the second edition of the database, and limiting access to the production instance and elevating the test instance to the new production instance by redirecting the second application server to the first file system and providing the second user with access after a test period and using a load balancer to direct requests from the first and second users to the first and second application servers.

2. The method of claim 1, wherein the database and editions thereof are provided by a database server.

3. The method of claim 1, wherein the authentication of the first and second users is performed by a database server.

4. A method comprising:

receiving an updated instance, the updated instance including an updated application instance, an updated database instance, or any combination thereof, wherein a database maintains a production database instance and the updated database instance as separate editions;

provisioning a first file system with the updated application instance and a first subset of application servers with access to the first file system to provide the updated application instance access to the updated database instance;

provisioning a second subset of application servers with access a production instance and access to the production database instance;

identifying a subset of users from a plurality of users to provide access to the updated instance for testing purposes;

authenticating a subset of other users of the plurality of users;

providing the subset of users with access to the updated instance and the other users with access to a production instance during a testing period based on the other users not being provided access to the updated instance; and after the testing period, provisioning a second subset of application servers with the updated application instance or access to the updated database instance and directing, by a load balancer, the subset of users and the other users to the first and second subsets of application servers to access the updated application instance or updated database instance.

5. The method of claim 4, further comprising eliminating access to the production instance after the test period.

6. The method of claim 4, further comprising direct, by the load balancer, the subset of users to the first subset of application servers and other users to a second subset of application servers during the testing period.

7. The method of claim 4, wherein authentication is performed by a database server.

8. The method of claim 4, wherein the production application instance and the updated application instance are maintained on separate file systems.

9. A system for providing an application, the system comprising:
- a load balancer configured to balance requests across a plurality of application servers;
- a database server including at least one storage, the database configured to maintain an updated database instance and a production database instance as editions of a database;
- a first file system configured to provide an updated application instance and a second file system configured to provide a production application instance;
- the plurality of application servers including a first subset of application servers configured to access the first file system to provide the updated application instance and a second subset of application servers configured to access the second file system to provide the production application instance;
- the database server further configured to authenticate a first subset of users as having access to the updated application instance and a second subset of users as having access to the production application instance;
- the load balancer further configured to direct requests from the first subset of users to the first subset of application servers based on the first subset of users having access to the updated application instance, and to direct requests from the second subset of users to the second subset of application servers based on the second subset of users having access to the production application instance but not the updated application instance;
- the first subset of application servers further configured to provide the first subset of users with access to the updated application instance and to submit a first query to the database, wherein the database responds to the first query based on the updated database instance;
- the second subset of application servers further configured to provide the second subset of users with access to the production application instance and to submit a second query to the database, wherein the database responds to the second query based on the production database instance; and
- wherein, after testing the updated application instance, the second subset of application servers are reconfigured to access the first file system to provide the updated application instance
- wherein, after a test period is completed, the second subset of users is granted access to the updated application instance and the updated database instance and the load balancer is reconfigured to direct requests from the first and second subset of users to the plurality of application servers including the first and second subsets of application servers.

10. The system of claim 9, further comprising a first and a second file systems, the first file system configured to maintain an updated application instance and the second file system configured to maintain a production application instance.

11. The method of claim 9, wherein, after a test period is completed, the second subset of application servers is reconfigured to provide the updated application instance.

12. The system of claim 9, wherein user access to the production application instance is eliminated after the test period.

* * * * *